United States Patent [19]

Shattuck et al.

[11] 4,093,358

[45] June 6, 1978

[54] HIGH EFFICIENCY ELECTROCHROMIC DISPLAY DEVICE

[75] Inventors: Meredith David Shattuck; Glenn Tavernia Sincerbox, both of San Jose, Calif.

[73] Assignee: International Business Machines Corporation, Armonk, N.Y.

[21] Appl. No.: 754,303

[22] Filed: Dec. 27, 1976

[51] Int. Cl.² .......................... G02F 1/17; G02F 1/23; C09K 3/00
[52] U.S. Cl. .................................. 350/357; 252/500; 252/408
[58] Field of Search ................... 252/408 R, 501, 500; 350/160 R; 96/1.5, 1.6

[56] References Cited

U.S. PATENT DOCUMENTS

| | | | |
|---|---|---|---|
| 3,180,729 | 4/1965 | Klupfel et al. | 96/1.5 |
| 3,451,741 | 6/1969 | Manos | 350/160 R |
| 3,806,229 | 4/1974 | Schoot et al. | 252/408 |
| 3,824,099 | 7/1974 | Champ et al. | 96/1.5 |
| 3,837,851 | 9/1974 | Shattuck et al. | 96/1.5 |
| 3,854,794 | 12/1974 | Van Dam et al. | 350/160 R |
| 3,957,352 | 5/1976 | Leibowitz | 350/160 R |
| 4,018,508 | 4/1977 | McDermott et al. | 350/160 R |

OTHER PUBLICATIONS

Seki, H., IBM Tech. Discl. Bull., vol. 19, No. 2, pp. 653–654 (Jul. 1976).
Pragst, V. F., et al., Journal f. prakt. Chemie, vol. 316, No. 2, pp. 267–285 (1974).
Pragst, V. F., Journal f. prakt. Chemie, vol. 315, No. 3, pp. 549–564 (1973).
Kaufman, F. B., et al., IBM Tech. Discl. Bull., vol. 20, No. 5, pp. 2001–2004 (Oct. 1977).

Primary Examiner—Benjamin R. Padgett
Assistant Examiner—T. S. Gron
Attorney, Agent, or Firm—Joseph G. Walsh

[57] ABSTRACT

This invention relates to a reversible display device based upon the electrochromic properties of triaryl pyrazoline compounds when used in conjunction with a complementary redox material.

8 Claims, No Drawings

HIGH EFFICIENCY ELECTROCHROMIC DISPLAY DEVICE

FIELD OF THE INVENTION

The present invention is concerned with a reversible display device. The device utilizes the electrochromic effect obtained using a triaryl pyrazoline compound and a complementary redox material. The triaryl pyrazoline compounds useful in the present invention have the formula

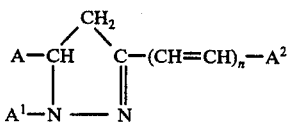

wherein N is 0 or 1, and A, $A^1$ and $A^2$ are each aryl radicals.

THE PRIOR ART

Pyrazoline compounds have been known for some time and their preparation has been described in the literature. The prior art, for example U.S. Pat. Nos. 3,180,729 and 3,549,362, teaches the photoconductive nature of pyrazolines. The anodic oxidation and electrochemical luminescence of pyrazoline is taught in the Journal fur Praktische Chemie Band 315 Heft 3, 1973, pages 549-564, and Band 316 Heft 2, 1974, pages 267-285. The use of pyrazoline compounds as charge transport layers in electrophotography is taught in U.S. Pat. Nos. 3,824,099 and 3,837,851. As far as we are aware, however, there is no prior art teaching of the use of triaryl pyrazoline compounds in an electrochromic display device.

The prior art teaches several types of electrochromic display devices. Among other things, they differ in the nature of the materials used therein. U.S. Pat. No. 3,806,229 describes a device based upon the use of viologen compounds. Another system is based upon the inorganic material tungsten trioxide. U.S. Pat. No. 3,451,741 describes an electrochromic display device using any of several different types of organic materials, including anthraquinones, hydroxyaryl arylamines, diphenoquinone compounds, indigo and thioindigo materials, and, in particular, hydroxyaryl imidazole materials. This latter patent provides a good description of the operation of a reversible electrochromic device utilizing oxidant/reductant pairs.

The display devices obtained according to the present invention have advantages over those of the prior art. In particular, the present invention provides devices having electrochromic efficiencies at least a factor of two greater than those known to the prior art, in some cases, an order of magnitude greater.

SUMMARY OF THE INVENTION

According to the present invention, an electrochemical reaction is used to form a color absorbing species. This color forming process is utilized as a display device by containing the reactive medium between electrically conductive electrodes, at least one of which must be transparent. In such a configuration, information is selectively displayed by segmenting the electrodes into a suitable pattern and applying a potential across the proper electrodes to produce coloration in the desired areas.

In the present invention, the electrochromic coloration reaction takes place due to the oxidation of the triaryl pyrazoline compound at the anode and simultaneous reduction of a suitable redox material at the cathode. The pyrazoline compound has the formula described above. The useful complementary redox materials are electron acceptors and include such compounds as, for example, phenylhydroquinone, fluorenones, fluorenes, carbazoles which are polynitro substituted, and benzene compounds substituted with electron withdrawing groups. The electron acceptor compound serves as a complementary material in an oxidation/reduction process with the pyrazoline. In that oxidation/reduction reaction, the pyrazoline compound is oxidized, while the electron acceptor material is reduced, thereby tending to balance the display cell electrochemically. This electrochemical balance results in good reversibility of cell operation. Still another advantage is a reduction of electrode degradation. Increased color change may also be obtained due to color produced by the reduced form of the complementary redox material, in addition to the oxidized pyrazoline. Erasure of the image is obtained in a symmetrical cell by shortcircuiting the cell or by momentary application of the reverse polarity potential.

As is known to the prior art, the electrochromic reaction is carried out in an anhydrous solvent. Useful solvents include, for example, methyl ethyl ketone, dimethylformamide, dimethylsulfoxide, N, N-dimethylacetamide, tetrahydrofuran, and acetonitrile.

From the list of solvents shown above, tetrahydrofuran is the best solvent for dissolving large amounts of pyrazolines. Acetonitrile is the poorest for dissolving pyrazolines, but in terms of solution conductivity, the most conductive solutions are obtained with acetonitrile, and the least conductive with tetrahydrofuran. Methyl ethyl ketone is a fair solvent for both solubility and conductivity. The choice of optimum solvent depends on solubility required, conductivity, stability, etc.

It is desirable to add a salt to increase the conductivity of the solution, since the passage of current is dependent on ions. The choice of optimum electrolyte is dictated by the solubility in the solvent used, the dissociation constant, the mobility and the discharge potential. Useful salts include, for example, tetraalkylammonium salts, such as tetraethylammonium perchlorate, tetrabutylammonium perchlorate, tetraethylammonium fluoborate, and tetrabutylammonium fluoborate, ammonium perchlorate, ammonium fluoborate, lithium perchlorate and lithium chloride.

The electrochromic efficiency of a material is a parameter of prime importance in determining the utility of that material in a display device. In an electrochemical display device as considered here, an individual molecule becomes colored as the result of the gain or loss of an integral number of electrons. Assuming that the molecules do not become decolored rapidly by another process, the number of colored molecules produced per unit area in a display device will be proportional to the charge per unit area passed through the device. Since, according to Beer's law, the number of colored molecules is linearly related to the optical density of the display device through the extinction coefficient, it is convenient to define the electrochromic efficiency of a material as the induced optical density obtained as the result of the passage of a given charge per unit area, usually as $mC/cm^2$.

The effect of the electrochromic efficiency on the operation of a display device is now apparent. For identical devices operating at the same voltages but using materials with different electrochromic efficiencies, the device using the material with the higher electrochromic efficiency will consume less power. Alternatively, a larger display panel can be operated at the same power consumption by using the higher efficiency material. In addition to these obvious advantages in terms of power consumption, higher efficiency materials make possible display devices which would otherwise not function properly. Since transparent conductors are usually used with electrochromic display devices and there is generally a trade-off with respect to the transparency and conductivity of these conductors, potential gradients along the transparent conductor due to IR losses can be troublesome. Such potential gradients can lead to nonuniformity of the display coloration or may require that the display be written at reduced rates to reduce the current in the electrodes. A higher efficiency electrochromic material offers significant advantages in overcoming these problems since it can provide the same optical performance as a lower efficiency material, but at lower current levels.

Reliable and reproducible measurements of the electrochromic efficiency of various materials can be made since the electrochromic efficiency does not depend on the concentration of the electrochromic material in solution, the applied voltage or the geometry of the display device. Measurements of the electrochromic efficiency of some common electrochromic materials have been reported by I. F. Chang and W. E. Howard, IEEE Trans. Electron Devices, ED-22, 749 (1975). Their results show a linear relationship between induced optical density and the charge per unit area passed through the display device, as anticipated. The slope of the line through the data points gives the electrochromic efficiency. Monochromatic light was used in this investigation, so that the electrochromic efficiency, which is in general a function of wavelength, was determined at a specific wavelength or wavelengths. The table below summarizes some of the relevant results obtained by Chang and Howard.

| Material | Wavelength (nm) | Electrochromic Efficiency (OD/mC.cm$^{-2}$) |
|---|---|---|
| $WO_3$ | 550 | 0.04 |
| heptyl viologen dibromide | 513.5 | 0.075 |
| heptyl viologen dibromide | 544 | 0.13 |

For heptyl viologen dibromide, the two wavelengths listed correspond to the maxima in the absorption spectra, where the electrochromic efficiency will also be highest.

To determine the electrochromic efficiency of a pyrazoline containing solution, the optical density of a cell of known area was monitored by measuring the attenuation of the light from a He—Ne laser at 632.8 nm passing through the cell. The cell consisted of two glass plates with a transparent conductive coating, separated by a 5 mil Mylar spacer. (Mylar is duPont's brand of polyethylene terphthalate). The spacer had a ½ inch diameter circle punched out to contain the electrochromic solution, corresponding to a 1.27 sq. cm. area. This cell was filled with a solution of 0.09 molar 1-p-methoxyphenyl-3-p-diethyl-aminostyryl-5-p-diethyl-aminophenyl-$\Delta^2$-pyrazoline (MeO -DEASP), 0.04 molar phenyl quinone and 0.13 molar tetrabutylammoniumperchlorate dissolved in tetrahydrofuran (THF). This cell was subjected to a series of voltage pulses ranging in duration from 10 to 500 msec. and in amplitude from 0.5 to 20 volts. For each voltage pulse the induced optical density at 632.8 nm was obtained by measuring the decrease in the laser light passed through the cell, and the charge required per unit area was determined from the current, the pulse time and the area of the cell. When the induced optical density at 632.8 nm is plotted as a function of charge per unit area, the result indicates a linear relationship between induced optical density and charge per unit area, independent of pulse duration and amplitude. The slope of the line drawn through the experimental points indicates an electrochromic efficiency of 0.68 OD/mC·cm$^2$. The efficiency of the electrochromic solution used in this test is thus more than a factor of five higher than the most efficient material reported by Chang and Howard. It should be noted that the He—Ne laser was used as a light source as a matter of convenience. The peak of the absorption spectrum of the MeO-DEASP cation is at approximately 650 nm, so that measurements made with light of this wavelength would result in a still higher electrochromic efficiency.

While the electrochromic efficiencies determined at specific wavelengths can be used to estimate the efficacy of an electrochromic material in a display device, a more meaningful determination should take into account the electrochromic response at all wavelengths to which the human eye is sensitive and weight the response according to the sensitivity of the human eye at each wavelength. For this reason, the apparatus described above was modified. The He—Ne laser was replaced with a tungsten-halogen lamp filtered by an infrared absorbing 1-69 filter. This combination of lamp and filter results in nearly uniform intensity of illumination throughout the visible spectrum. The silicon photodetector used to measure the attenuation of the light passed through the display cell was covered with a photopic filter, so that the sensitivity of the detector as a function of wavelength closely matched that of the human eye. Further measurements were carried out using this modified apparatus on the solution described above. In this series of measurements, an electrochromic efficiency of 0.24 OD/mC·cm$^{-2}$ obtained.

The same apparatus was used to measure the electrochromic efficiency of a solution of 0.025 grams of heptylviologen dibromide in 0.5 grams of water. An efficiency of 0.10 OD/mC·cm$^{-2}$ was obtained.

In like manner, the efficiency of a solution of 0.8 pts. by weight of 2-(4-hydroxy-3,5-dimethylphenyl)-4,5-bis(methoxyphenyl) imidazole, 1.1 parts ditertiary butyl benzoquinone, 2.7 parts aluminum p-toluene sulfonate, 4.8 parts dimethylformamide was evaluated. An electrochromic efficiency of 0.025 OD/mC·cm$^{-2}$ was obtained. This is the same formulation as described in Example 10 of U.S. Pat. No. 3,451,741.

In addition, electrochromic solutions containing various other pyrazolines as color producing agents were evaluated for electrochromic efficiency using the apparatus with photopic response. The results are summarized below:

| Compound | Electrochromic Efficiency (OD/mC.cm$^{-2}$) |
| --- | --- |
| 1-phenyl-3-p-aminophenyl-5-phenyl-$\Delta^2$-pyrazoline; | 0.065 |
| 1-phenyl-3-p-dimethylaminophenyl 5-phenyl-$\Delta^2$-pyrazoline; | 0.055 |
| 1-phenyl-3-p-dimethylaminostyryl-5-p-dimethylaminophenyl-$\Delta^2$-pyrazoline; | 0.23 |
| 1-phenyl-3-p-dipropylaminostyryl-5-p-dipropylaminophenyl-$\Delta^2$-pyrazoline; | 0.20 |
| 1-p-methoxyphenyl-3-p-dipropylaminostyryl-5-p-dipropylaminophenyl-$\Delta^2$-pyrazoline; | 0.22 |
| 1-phenyl-3-p-methoxystyryl-5-p-methoxyphenyl-$\Delta^2$-pyrazoline; | 0.035 |
| 1-p-methoxyphenyl-3-diphenylaminophenyl-5-phenyl-$\Delta^2$-pyrazoline; | 0.12 |
| 1-phenyl-3-p-diethylaminostyryl-5-p-diethylaminophenyl-$\Delta^2$-pyrazoline; | 0.24 |
| 1-p-methoxyphenyl-3-p-methoxystyryl-5-p-methoxyphenyl-$\Delta^2$-pyrazoline; | 0.17 |
| 1-p-bromophenyl-3-p-diethylaminostyryl-5-p-diethylaminophenyl-$\Delta^2$-pyrazoline; | 0.11 |
| 1-p-methoxyphenyl-3-p-dimethylaminostyryl-5-p-dimethylaminophenyl-$\Delta^2$-pyrazoline; | 0.17 |
| 1-phenyl-3-p-methoxyphenyl-5-o-methoxyphenyl-$\Delta^2$-pyrazoline; | 0.03 |
| 1-o-methoxyphenyl-3-p-diethylaminostyryl-5-p-diethylaminophenyl-$\Delta^2$-pyrazoline. | 0.18 |

The following examples are given solely for purposes of illustration and are not to be considered limitations on the invention, many variations of which are possible without departing from the spirit or scope thereof.

EXAMPLE I

A cell was prepared by filling the space between parallel plate conductive electrodes with an electrochromic solution consisting of 0.4 mole 1-p-methylphenyl-3-p-diethylaminostyryl-5-p-diethylamino phenyl-$\Delta^2$-pyrazoline; 0.4 mole phenyl p-benzoquinone; 1.0 mole tetrabutylammonium fluoborate in a 1:1 mixture of tetrahydrofuran and acetonitrile. One of the electrodes consisted of a thin indium oxide layer on glass while the opposite electrode was gold on glass. The space between the plates was approximately 40 microns and was maintained by a non-conductive spacer. Voltage was applied to the cell by means of a D.C. power supply. A positive voltage of 1.5 volts was applied to the indium oxide electrode. The negative lead was connected to a gold electrode. Application of a 10 millisecond pulse to the cell produced a color change from an initially light yellow to a blue green.

EXAMPLE II

A cell consisting of conductive indium oxide coated glass plates was arranged with the conductive surfaces facing each other. The plates were separated approximately 75 microns with a non-conductive spacer. The space between the plates was filled with a solution of 0.09 mole 1-p-methoxyphenyl-3-p-diethylamino styryl-5-p-diethylamino phenyl-$\Delta^2$-pyrazoline; .13 mole tetrabutylammonium perchlorate; 0.09 mole 2,7 dinitrofluorene in N,N-dimethylacetamide. A potential of 6 volts was applied across the cell by means of a power supply. A 100 millisecond pulse produced an optical density change of 0.5 with a color change from yellow to dark green.

EXAMPLE III

A cell constructed as in Example II was filled with a solution of 0.09 mole 1-p-methoxyphenyl-3-p-diethylaminostyryl-5-p-diethylamino phenyl-$\Delta^2$-pyrazoline; 0.09 mole 1,5 dinitronapthalene; 0.13 mole tetrabutylammonium perchlorate in N,N-dimethylacetamide. With 6 volts applied, the cell was driven to a dense green image. The background color was a pale yellow.

EXAMPLE IV

A cell constructed of indium oxide coated glass plates as in Example II was filled with the following solution and the indium oxide plates were separated by a 125 micron non-conductive spacer. 0.09 mole 1-phenyl-3-p-methoxy phenyl-5-p-methoxy phenyl-$\Delta^2$-pyrazoline; 0.04 mole phenyl p-benzoquinone; 0.13 mole tetrabutylammonium perchlorate in dimethylformamide. Using 50 millisecond pulses from a power supply set at 2.1 volts, a color change occurred from very pale yellow to deep orange.

EXAMPLE V

A formulation consisting of 0.09 mole 1-phenyl-3-p-diethylaminophenyl-5-phenyl-$\Delta^2$-pyrazoline; 0.04 mole phenyl-p-benzoquinone; 0.13 mole tetrabutylammonium perchlorate in dimethylformamide was placed between conductive plates as in Example IV. The cell was activated with a D.C. power supply set at 2.1 volts. The nearly colorless solution turned orange.

EXAMPLE VI

A solution of 0.09 mole 1-p-methoxy phenyl-3-p-dimethylamino styryl-5-p-diethylamino phenyl-$\Delta^2$-pyrazoline; 0.04 mole phenyl-p-benzoquinone; 0.13 mole tetrabutylammonium perchlorate in dimethylformamide was placed in a cell as in Example IV. With 2.1 volts applied, a 50 millisecond pulse produced a dense green color from the initially pale yellow background color.

EXAMPLE VII

A solution consisting of 0.09 mole 1-phenyl-3-p-aminophenyl-5-o-methoxyphenyl-$\Delta^2$-pyrazoline; mole phenyl-p-benzoquinone; .13 mole tetrabutylammonium perchlorate in dimethylformamide was placed in a cell as in Example IV. A potential of 2.1 volts across the cell produced a black solution from a background color of pale amber.

EXAMPLE VIII

A clock display panel was constructed on two 2 × 2½ inch glass plates coated with 50 ohm per square transparent conductor (NESA glass). The front plate was etched to give three digit positions of seven segment numerals, plus one digit position for the numeral 1. Each segment lead was brought out to the glass plate edge for connection to the drive signals. The back plate was left unetched. This plate was the grounded backplane for the display. The glass plates were assembled with a 5 mil spacer between them. This 5 mil cavity was then filled with the electrochromic solution described in Example VII.

The drive for the electrochromic display panel was of the direct segment drive type. Each segment electrode in the display has one of two voltage levels applied to it with reference to the backplane. The write level was a positive voltage of magnitude greater than the electrochromic threshold. This voltage caused the written segments to color and to maintain that color. The clear level was a negative voltage of magnitude less than the electrochromic threshold. Segment clearing could be accomplished by either an open circuit or by shorting the segment to the backplane, but application of the clear voltage causes the segment to clear more rapidly. The display was driven with a write level of 0.58 volts at 13 microamperes. The clear voltage was −0.3 volts.

The drive unit to the display panel was a standard integrated circuit digital clock chip with special output drivers giving the previously described voltage levels. Minutes and hours were displayed on the panel with a switch selectable minutes and seconds display mode. In the minutes and seconds mode, the least significant digit segments changed at a one second rate. The clock was run continuously for 140 hours. Time was displayed in deep green numerals against a pale yellow background. The contrast decreased to a low level at 24 hours. At 72 hours the segments had completely faded out, but an increase in the drive potential again produced a display with good contrast.

What is claimed is:

1. In a reversible electrochromic display device comprising a reactive medium between two electrically conductive electrodes, at least one of which is transparent, said medium comprising an anhydrous solvent and an oxidant/reductant pair wherein the reductant is an electron acceptor, the improvement according to which the oxidant is a triaryl pyrazoline compound having the formula:

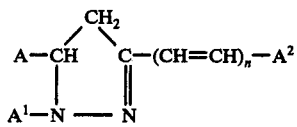

wherein A, $A^1$ and $A^2$ are each phenyl or phenyl substituted with an electron releasing group, and $n$ is zero or one.

2. A device as claimed in claim 1 wherein the oxidant is a 1, 3, 5-triphenyl-$\Delta^2$-pyrazoline compound.

3. A device as claimed in claim 1 wherein the oxidant is a 1, 5-diphenyl-3-styryl-$\Delta^2$-pyrazoline compound.

4. A device as claimed in claim 1 wherein the oxidant is 1-p-methoxyphenyl-3-p-diethylaminostyryl-5-p-diethylamino-phenyl-$\Delta^2$-pyrazoline.

5. A device as claimed in claim 1 wherein the oxidant is 1-phenyl-3-p-diethylaminostyryl-5-p-diethylaminophenyl-$\Delta^2$-pyrazoline.

6. A device as claimed in claim 1 wherein the oxidant is 1-phenyl-3-p-dimethylaminostyryl-5-p-dimethylaminophenyl-$\Delta^2$-pyrazoline.

7. A device as claimed in claim 1 wherein the oxidant is 1-p-methoxyphenyl-3-p-dipropylaminostyryl-5-p-dipropylaminophenyl-$\Delta^2$-pyrazoline.

8. A device as claimed in claim 1 wherein the oxidant is 1-phenyl-3-p-dipropylaminostyryl-5-p-dipropylaminophenyl-$\Delta^2$-pyrazoline.

* * * * *